United States Patent [19]
Dalibout et al.

[11] 3,838,893
[45] Oct. 1, 1974

[54] LOAD COMPENSATING VALVE DEVICE HAVING A CONTROL VALVE ON ONE SIDE AND AN AIR RESERVOIR ON THE OTHER WITH PIPE CONNECTIONS TO THE RESERVOIR

[75] Inventors: Georges Dalibout, Gagny; Claude Dubois, Paris, both of France

[73] Assignee: Wabco Westinghouse, Freinville-Sevran, France

[22] Filed: Sept. 21, 1973

[21] Appl. No.: 399,606

[52] U.S. Cl............................................. 303/22 R
[51] Int. Cl.............................................. B60t 8/22
[58] Field of Search.... 303/22 A, 22 R, 23 A, 23 R, 303/59, 66; 188/195

[56] References Cited
UNITED STATES PATENTS

| | | | |
|---|---|---|---|
| 2,418,013 | 3/1947 | Cook.................................. | 303/22 R |
| 2,482,246 | 9/1949 | Cook et al. ........................ | 303/22 R |
| 2,501,713 | 3/1950 | Cook.................................. | 303/22 R |
| 2,515,963 | 7/1950 | McClure............................ | 303/22 R |

Primary Examiner—Duane A. Reger
Attorney, Agent, or Firm—R. W. McIntire, Jr.; W. F. Poore

[57] ABSTRACT

This invention relates to a railway vehicle brake apparatus wherein an air operated load compensating relay valve device is disposed between and rigidly secured to both a brake control valve of the graduated release type and the control reservoir for this brake control valve. A plurality of passageways extend through the load compensating relay valve device to provide communications through which fluid under pressure is supplied from the control reservoir and also an auxiliary reservoir to the brake control valve that has a supply and release valve mechanism which is operable in response to variations of pressure in a train brake pipe relative to a constant pressure maintained in the control reservoir to effect the supply of fluid under pressure from the auxiliary reservoir to the load compensating relay valve device to cause a brake application or to release fluid under pressure from this relay valve device to atmosphere to cause a release of a brake application.

13 Claims, 11 Drawing Figures

Fig. 4

LOAD COMPENSATING VALVE DEVICE HAVING A CONTROL VALVE ON ONE SIDE AND AN AIR RESERVOIR ON THE OTHER WITH PIPE CONNECTIONS TO THE RESERVOIR

BACKGROUND OF THE INVENTION

In heretofore known fluid pressure operated railway vehicle brake apparatus a self-lapping type of relay valve device may be operated by a limited volume of fluid under pressure supplied thereto by a control valve to effect the supply of a substantially larger volume of air to a brake cylinder. Moreover, such known brake apparatus may incorporate therein means whereby the pressure of the fluid supplied from the control valve for operating the relay valve device is varied in accordance with the load carried on the vehicle.

The sequence of operation of this heretofore known brake apparatus is such that a reduction of the pressure of a fluid in a train brake pipe relative to a constant pressure in a control reservoir establishes a fluid pressure force for effecting operation of the control valve to supply fluid under pressure to cause the relay valve device to supply fluid under pressure from an auxiliary reservoir to a brake cylinder for causing a brake application and also for acting in opposition to the operating fluid pressure to cause the self-lapping operation of the relay valve device. A subsequent brake release is effected by an increase of the pressure of the fluid in the brake pipe whereupon the control valve operates in response thereto to release fluid under pressure from the relay valve device which in turn operates to release fluid under pressure from the brake cylinder to atmosphere.

Furthermore, for many years it has been customary to secure the control valve on each railway vehicle to the control reservoir which in turn is attached by angle brackets to the body of the vehicle. Heretofore the relay valve device has been ordinarily mounted remote from the control valve and its control reservoir. A plurality of pipes have heretofore been used to connect the relay valve device to the control valve, the brake cylinder and the auxiliary reservoir whereby an operating fluid under pressure is supplied from the auxiliary reservoir to the relay valve device by the control valve so that the relay valve device is operated thereby to effect the supply of fluid under pressure from the auxiliary reservoir to the brake cylinder. This separate mounting of the relay valve device results in a scattering of the several devices comprising the brake apparatus beneath the body of the vehicle which requires the use of complicated pipe connections between these devices and pipes.

In actual practice, it is desirable to use a relay valve device wherein the ratio between the operating pressure and the pressure supplied thereby to the brake cylinder may be varied in accordance with the load carried by the vehicle or the speed thereof.

Accordingly, it is the general purpose of the present invention to avoid the disadvantage of separately mounting the several devices comprising a railway brake apparatus by disposing the relay valve device between and in abutting relationship with the control valve and its control reservoir.

SUMMARY OF THE INVENTION

According to the present invention, a novel relay valve device, the ratio of its control pressure to its delivery pressure which may be selectively varied or maintained constant, is disposed between and secured to a graduated release type control valve and the control reservoir therefor. Without changing its basic structure, this relay valve device may be modified so as to be operated by electropneumatic valve devices thereby enabling its use in an electropneumatic railway vehicle brake apparatus.

According to the invention, in an air braking equipment for a railroad vehicle (including a segment of train pipe attached to a brake control valve, a control reservoir supporting the brake control valve and crossed by different pipes necessary for the operation of the control valve, and an air operated relay valve device connected to an auxiliary reservoir and to at least one brake cylinder so as to feed the brake cylinder from the auxiliary reservoir, or so as to put the brake cylinder in contact with the atmosphere when respectively increasing or decreasing the operating pressure supplied by the brake control valve to an operating chamber positioned inside the relay valve device), a relay valve device is inserted and attached by mounting between the brake control valve and its control reservoir, and it is crossed by a first pipe or passageway that connects the control reservoir to the brake control valve and by a second pipe or passageway that connects the auxiliary reservoir to the brake control valve. The indispensable connecting of the relay valve device with the auxiliary reservoir is achieved by a branch of the second internal pipe or passageway which branch is connected to the relay valve device.

The relay valve device designed thus entails a simplification with respect to the mounting thereof and the elimination of several previously used connecting pipes, which are incorporated in the present relay valve device.

In the heretofore known relay valve devices, there is often a pilot piston subjected to the pressure in a service tank or chamber. There is also a compensating piston which cooperates with a supply and exhaust valve mechanism capable of supplying the brake cylinder with fluid under pressure from the auxiliary reservoir and of putting it in contact with the atmosphere. This compensating piston is subjected to the pressure supplied by the supply and exhaust valve mechanism to the brake cylinder. A movable power transformer device in the form of a pivoted lever mechanically connects the pilot and compensating pistons and, in order to transmit a force depending on the load of the vehicle between these pistons, the above-mentioned device includes a movable carriage or fulcrum supporting a two-armed lever, one arm holding the support of the pilot piston and the other holding the support of the compensating piston. The carriage is subjected to the force of a return spring and is rigidly connected to a load compensating piston on which acts the pressure of a fluid conveyed thereto by a third pipe.

According to another characteristic of the invention, the third pipe and a branch of the second pipe emerge on a connecting face on the outside surface of the relay valve device which an interchangeable component is attached that assures the separation or the connection of the third pipe and the branch of the second pipe.

If the interchangeable component is a simple cut-off device separating the third pipe from the branch of the second pipe, or if the interchangeable component is a two-position switch valve controlled manually or automatically, alternately connecting the third pipe with the atmosphere and with the branch of the second pipe, the arrangement mentioned in the above paragraph makes it possible to provide an empty and load braking system.

A fourth passageway and pipe connected to a weighing device which supplies an air pressure as a function of the load on the vehicle, for example directly proportional to the load, may also emerge on the above-mentioned connecting face of the relay valve device and be opened or closed by the interchangeable component.

By means of this pipe, it is thus possible either to automatically control the two-position switch valve whose mounting possibility was just mentioned or, when the interchangeable component assures a permanent connection between the fourth and the third pipe, to continuously control the movement of the carriage and consequently the continuous variation of the pressure supplied by the relay valve device to the brake cylinder as a function of the load.

By means of internal pipes or passageways that will be more clearly described in reference to the figures, the load compensating relay valve device according to the invention also makes it possible to obtain several braking systems as a function of the velocity, and also makes it possible to provide an electropneumatic brake operation achieved by attaching the electrovalves necessary for this operation to the body of the relay valve device.

Furthermore, by forming the relay valve device with three main bodies assembled in a detachable fashion - the lower body containing principally the carriage and the two-armed lever, the central body containing principally the pilot and compensating pistons and the supply and exhaust valve mechanism, and the upper body containing the branch pipes and the connecting faces - it is possible to use at least one main body common to several types of relays and thus to reduce the number of spare parts that have to be kept in stock.

It is observed that the possibility of using the relay valve device in a number of different ways is definitely due to the fact that it is positioned between the brake control valve and the control reservoir therefor and that it is consequently possible to have pipe branches without an external piping system.

The detailed description that follows will provide a good explanation as to how the invention may be applied in practice.

DESCRIPTION

Figure 1:
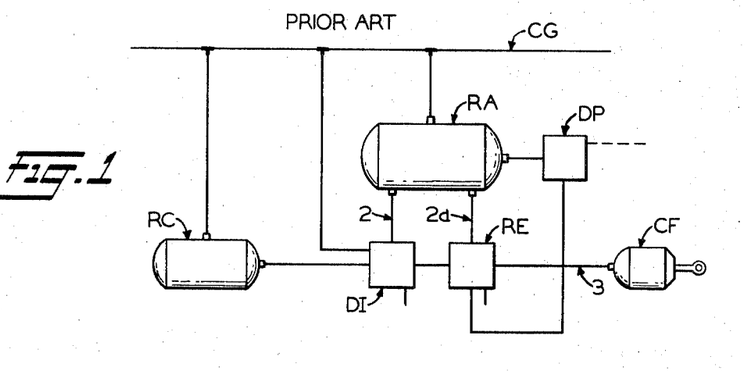
FIG. 1 is a piping diagram of a railroad car air braking equipment having a relay valve device of a known type.

A conventional variable load air braking equipment for a railroad vehicle is represented on FIG. 1 and includes the following items found on this vehicle: a train pipe (general conduit) CG, an auxiliary reservoir RA, and a control reservoir RC connected on one side to the train pipe and on the other side to a brake control valve DI. In response to a pressure drop in the train pipe compared with the pressure in the control reservoir, this brake control valve provides a "piloting" or operating pressure taken from the auxiliary reservoir and sent to a relay valve device RE. This relay valve device RE is operated by the driving pressure supplied to it by the brake control valve DI to supply a braking pressure. The degree of this braking pressure is a function of a so-called "weighing" auxiliary air pressure, which is essentially proportional to the load on the vehicle. This weighing pressure is furnished by a load-weighing mechanism DP which, for example, may be an air spring. The braking pressure is supplied by the relay valve device RE from the auxiliary reservoir RA to one or several brake cylinders CF.

Figure 2:
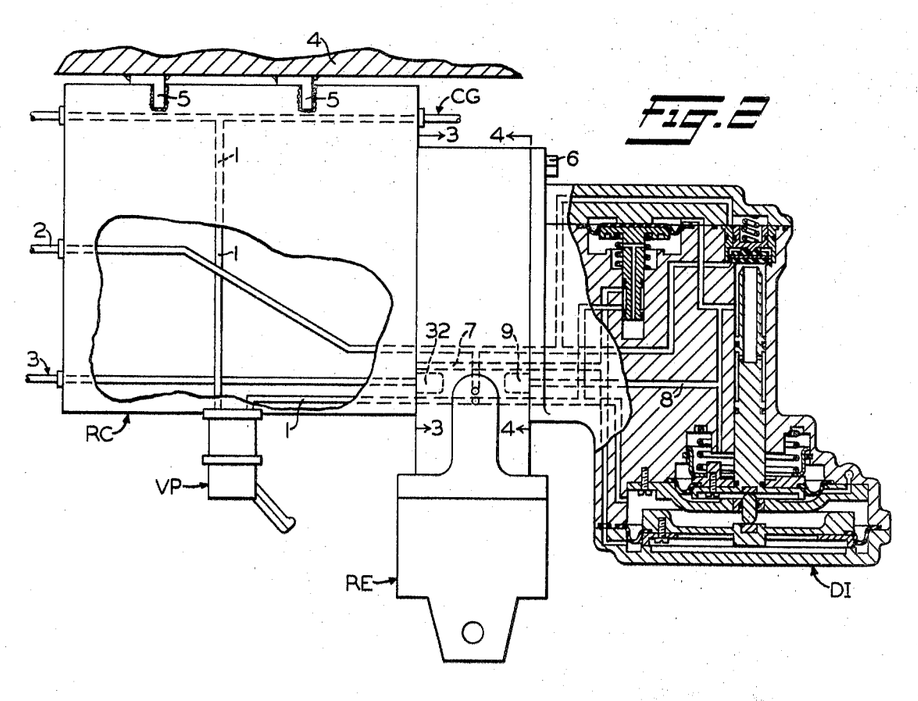
FIG. 2 represents a relay valve device, constructed according to the invention inserted between the brake control valve and its control reservoir.

FIG. 2 shows the brake control valve DI, the control reservoir RC, and the air relay valve device RE inserted between them according to the present invention. The pipes passing through the control reservoir RC have been represented in broken lines on this figure, where we see branch 1 of the train pipe CG connected to the brake control valve DI via the combined dirt collector and cut-out cock VP thereby making it possible to cut off the communication between the train pipe CG and the brake control valve DI so as to cut it out of service and, consequently, having the same effect on the braking of the vehicle as in the case of any breakdown whatsoever of this brake control valve. Represented by solid lines and broken lines, is a pipe 2, which connects the auxiliary reservoir RA to the brake control valve DI. A pipe 2a shown in FIG. 1 supplies fluid under pressure from the auxiliary reservoir RA to the relay valve device RE and a pipe 3 connects the relay valve device RE and the brake cylinder CF. As shown in FIG. 2, the control reservoir RC is attached to body 4 of the vehicle by clips or clamps 5, while the brake control valve DI and the relay valve device RE are attached to the reservoir RC by detachable tightening devices such as cap screws 6.

Figure 3:
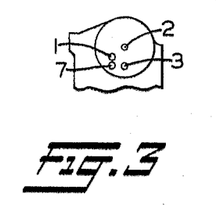
FIGS. 3 and 4 are partial sectional views taken along the lines 3—3 and 4—4 of the relay valve device shown in FIG. 2 and looking in the direction of the arrows.

The face of the relay valve device RE represented in FIG. 3 is positioned opposite the control reservoir RC and contains the outlets of pipes 1, 2, and 3 as well as the outlet of pipe 7, which connects the control reservoir RC to the brake control valve DI and crosses relay valve device RE according to the invention without any branching.

Figure 4:
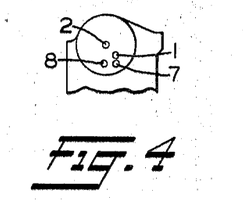

The face of the relay valve device RE represented on FIG. 4 is positioned opposite the brake control valve DI and contains the outlets of pipes 1, 2, and 7 as well as the outlet of pipe 8, which connects the brake cylinder port of the service valve of the brake control valve DI, providing the operating pressure, to the service tank 9 (FIG. 5) of the relay valve device RE.

Figure 5:
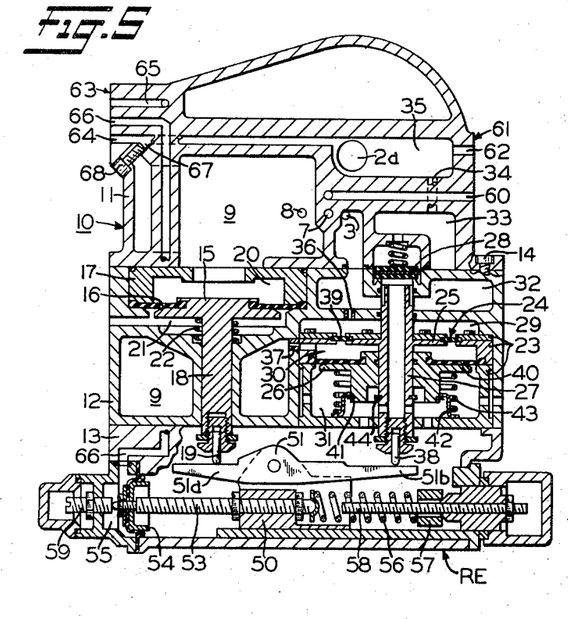
FIG. 5 is an enlarged vertical sectional view of the load compensating relay valve device shown in FIG. 2.

The load compensating relay valve device RE, represented in a more detailed fashion in FIGS. 5, has a body or sectionalized casing 10 made up of three parts, i.e., an upper casing section 11 essentially designed to contain the service tank 9 and the majority of the various pipes permitting the multiple use of this apparatus, a middle casing section 12 where the various pistons of the relay valve device are located as well as the air supply and exhaust valve mechanism, and a lower casing section 13 containing a lever-holder carriage which modulates the force produced by the pilot piston, and a load compensating piston designed to move this carriage to different positions. These three casing sections are assembled by tightening devices such as cap screws 14.

The middle casing section 12 will be described first. It consists of diaphragm follower 15 mounted in a cavity. Diaphragm follower 15, which is capable of being displaced axially, is held by a diaphragm 16 attached on its internal periphery to this diaphragm follower 15 and has its external periphery clamped between a support surface formed on middle casing section 12 and a plate 17. Diaphragm follower 15 is in one piece with a rod 18 mounted so as to have a sliding fit in a bore in middle casing section 12 and containing on its lower end a finger 19, whose axial position may be adjusted. Diaphragm 16 has on its respective opposite sides two chambers 20 and 21 which are formed in middle casing section 12. Chamber 20 is part of the service tank 9 and it is connected to the brake cylinder port of brake control valve DI by pipe 8, in this embodiment. Chamber 21 is connected to the atmosphere, as is shown in FIG. 5, and contains the return spring 22 for diaphragm follower 15.

Middle casing section 12 is provided in another cavity with a three-part sectionalized annular member 23 in which a valve operating diaphragm stack 24 is mounted. This diaphragm stack moves along an axis which is parallel to the axis of displacement of the diaphragm follower 15 and transmits the driving force of this follower 15, modulated as a function of the load, to a valve mechanism.

The diaphragm stack 24 comprises two diaphragm followers 25 and 26, the diaphragm follower 25 being formed integral with a hollow rod 27 that has formed at its upper end, as viewed in FIG. 5, an annular exhaust valve seat which, when the hollow rod 27 is moved upward from the position shown, first abuts a disc-type supply and release valve 28 to cut off the communication to atmosphere via the hollow rod 27 and thereafter effects unseating of this valve 28 from an annular supply valve seat.

The diaphragm followers 25 and 26 are disposed in a cavity provided therefor in the annular member 23 and in cooperation with this member, form three chambers 29, 30 and 31 the latter being open to atmosphere via a bore extending through the annular member 23 and the casing section 12.

When the disc-type valve 28 is unseated from the annular supply valve seat, a communication is established between a chamber 32 formed in the casing section 12 and connected to the brake cylinder CF by the pipe 3 and a chamber 33 formed by the cooperative relationship of the casing sections 11 and 12. The chamber 33 is connected by a passageway 34 in the casing section 11 to a chamber 35 formed in this casing section 11. Opening into the chamber 35 is one end of the hereinbefore-mentioned pipe 2a that at its opposite end is connected to the auxiliary reservoir RA. as shown in FIG. 1.

As shown in FIG. 5, the chambers 29 and 32 are connected by a choke 36 through which the fluid under pressure supplied to the chamber 32 will flow to the chamber 29 until a downwardly acting force is established on rod 27 that overbalances the upwardly acting force that effected unseating of the valve 28 from the supply valve seat.

The chamber 30 is connected to the service tank 9 by a choke 37 carried by the casing section 12 and a short coaxial passageway in the annular member 23.

The lower end of the hollow rod 27 is provided with internal screw threads for receiving a screw-threaded plug that carries a finger 38. A lock nut enables the screw-threaded plug to be locked in any desired position. Thus, the plug and lock nut enable the finger 38 to be adjustable relative to the hollow rod 27.

The inner periphery of a pair of diaphragms 39 and 40 are respectively secured to the diaphragm followers 25 and 26 and the outer periphery of each of these diaphragms is clamped between two adjacent parts of the sectionalized annular member 23.

As can be seen from FIG. 5, the diaphragm follower 26 is slidably and sealably mounted on the hollow rod 27 and carries thereon a snap ring 41 which, while the diaphragm 40 and diaphragm follower 26 occupy the position shown in FIG. 5, abuts an inturned flange formed integral with the upper end of a spring seat 42. The lower end of this spring seat 42 is provided with an outturned flange that rests on the bottom of the lower one of the three parts of the sectionalized member 23. A spring 43 is disposed in surrounding relation to the hollow rod 27 and is interposed between the outturned flange of spring seat 42 and the diaphragm follower 26 so as to normally bias the snap ring 41 carried by this follower 26 against the inturned flange of spring seat 42.

As shown in FIG. 5, that portion of the hollow rod 27 below the diaphragm follower 26 and above the bottom of the lower one of the three parts of sectionalized member 23 is provided with a peripheral annular groove in which is disposed a snap ring 44 which acts as a stop to limit downward movement of the diaphragm 40 and diaphragm follower 26 relative to the hollow rod 27.

Since the spring 43 normally biases the diaphragm follower 26 and diaphragm 40 to the position shown in which the snap ring 41 abuts the inturned flange on spring seat 42, the fluid under pressure initially supplied to the chamber 30 via the choke 37 acts on the effective area of the lower side of the diaphragm 39 to produce a fluid pressure force that acts in an upward direction on the hollow rod 27. However, when the pressure in the chamber 30 has increased to a value sufficient to provide a force in excess of the force exerted on the diaphragm follower 26 by the spring 43, the diaphragm 40 and diaphragm follower 26 will be moved downward relative to the hollow rod 27 until the follower 26 is moved into abutting relationship with the snap ring 44 which acts as a stop.

As can be seen from FIG. 5, the effective area of the upper side of the diaphragm 40 is greater than the effective area of the lower side of the diaphragm 39. Therefore, any further increase in the pressure of the fluid in the chamber 30 produces a force that is transmitted to the rod 27 via the diaphragm follower 26 and the snap ring 44 which force acts in a downward direction on the rod 27 in opposition to a force acting in an upward direction on this rod and transmitted thereto from the diaphragm 16 in a manner hereinafter made apparent.

The lower casing section 13 of the body 10 of the load compensating relay valve device RE contains a cavity connected to the atmosphere via chamber 31. This cavity houses a carriage 50 constituting an adjustable fulcrum, which is guided in its movement and to which a rockable horizontal lever 51, divided up into two arms 51a and 51b is connected. Arm 51a supports finger 19 and arm 51b supports finger 38. Carriage 50 is operatively connected to one end of the rod 53 of a piston 54, separating from the rest of the cavity a chamber 55 to which may be supplied a weighing air pressure, i.e., an air pressure proportional to the load of the vehicle. The carriage 50 is biased towards the left by a spring 56 supported on an axially adjustable ring 57. Extending through ring 57 is an adjustable stop rod 58, which may serve to immobilize the carriage in a position assuring a fixed ratio for lever arms 51a and 51b. When chamber 55 is at atmospheric pressure, the left end of rod 53 is biased by the spring 56 against an adjustable stop 59.

The upper casing section 11 contains the majority of service tank 9, as well as various pipes for usage and adaptation of the load compensating relay valve device RE. A pipe 60 connected to train brake pipe 1 opens out on a lateral face 61 on the exterior of upper casing section 11, and a pipe 62 also opening at one end at face 61 opens at the other end into chamber 35 which is connected by pipe 2a to the auxiliary reservoir RA. A pipe 64 at one end also opens into chamber 35 and at its other end opens out on a lateral face 63, which is turned here so that it is opposite face 61. However, it may also be situated on the same side as face 61 or even coincide with it. Opening on this same face 63 is one end of a pipe 65 capable of being connected to a pressure source, in particular to a load weighing mechanism that provides an air pressure proportional to load and one end of a pipe 66 connected to the chamber 55. A branch 67 of pipe 64 connects with service tank 9 or is separated from this tank by being cut off in an airtight manner via a screw threaded plug 68, which is accessible from the outside for being dismantled and replaced.

As was already indicated, pipe 3 connects outlet chamber 32 with the brake cylinder CF. Pipe 7, which connects the control reservoir RC to the brake control valve DI, passes through the casing section 11 of body 10 of the relay valve device RE without branching, while pipe 8 connects service tank 9 to the brake cylinder port of the control valve DI.

Figure 6:
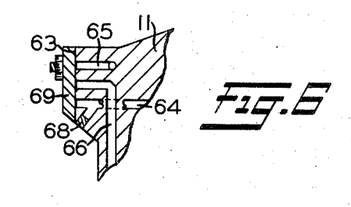
FIGS. 6 to 11 inclusive represent various connecting devices capable of being connected to the body of the relay valve device.

FIG. 6 represents the upper left segment of casing section 11 of the load compensating relay valve device 10 in the case where the latter is preadjusted to deliver an outlet pressure solely as a function of the pressure supplied by the control valve DI and thus independent of load. In this case, carriage 50 (FIG. 5) is immobilized in a position assuring the desired length of levers 51a and 51b by adjusting the existing stop devices 58 and 59 or by any other stop device whatsoever. A blanking pad 69 is attached in an airtight fashion to casing section 11 to close the end of pipes 64, 65 and 66 that open onto face 63. The other end of pipe 65 may be permanently open to the atmosphere.

Figure 7:
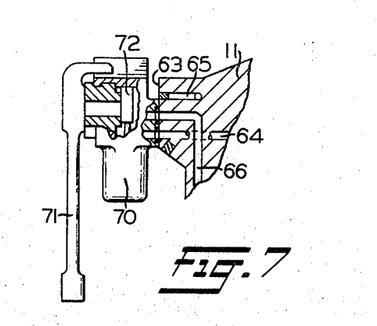

FIG. 7 represents a cock 70 of any suitable type for changing from an empty to a load braking system or rate, of any type whatsoever. This cock is attached in an air-tight fashion to the face 63. A handle 71 is in one piece with a cam 72 which operates a rotary change-over valve. Pipe 65 is separated from pipes 64 and 66 by a plug in its end. Handle 71 may have two positions: in one, pipe 66 is open to the atmosphere and in the other, pipe 66 is connected to pipe 64 and thus to the auxiliary reservoir. This type of embodiment provides for empty or load braking. The first system operates when pipe 66 is open to atmosphere, carriage 50 (FIG. 5) being pushed toward the left by spring 56 into the stop position. The second system operates when pipe 66 is connected to pipe 64 and the auxiliary reservoir so that carriage 50 is pushed toward the right, as viewed in FIG. 5 and immobilized in the stop position against rod 58.

Figure 8:
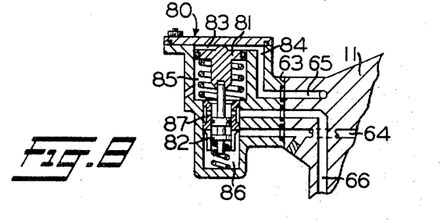

As shown in FIG. 8, a two-position valve device 80 for automatically changing the operating system is attached in an airtight fashion to face 63. Functioning as a switching device, this valve device 80 contains a piston 81 connected to a spool-type valve 82. Piston 81 is subjected on its upper face to the pressure of fluid in a chamber 83 connected to pipe 65 by a pipe 84. On its lower face, piston 81 is subjected to the reaction of a spring and to the atmospheric pressure found in a chamber 85. Pipe 64 is in communication with a chamber 86 and pipe 66 with an annular chamber 87 formed on an alignment bushing for the spool-type valve 82. When there is no pressure in chamber 83, chamber 87 is placed in communication with chamber 85, since the return springs and the pressure of the auxiliary reservoir found in chamber 86 push piston 81 and slide valve 82 upwards. When there is sufficient pressure in chamber 83 to overcome the prestress of the return springs and the pressure in the auxiliary reservoir acting on the slide valve 82, chambers 86 and 87 are connected together, which has the effect of connecting chamber 55 (FIG. 5) to the auxiliary reservoir RA.

Figure 9:
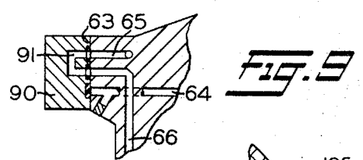

A blanking pad 90 represented on FIG. 9 is attached in an airtight fashion to face 63 and simply consists of an internal pipe 91 which connects pipes 65 and 66, pipe 64 being separated or blanked off from pipes 65 and 66. Since pipe 65 is connected to a load-weighing mechanism that supplies a weighing pressure proportional to the load of the vehicle, the weighing pressure thus provided in chamber 55 (FIG. 5) of the relay valve device RE functions to continuously provide a braking pressure according to the load.

Figure 10:
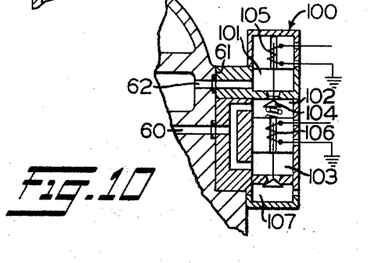

The double electrovalve 100 shown in FIG. 10 is attached to face 61 opposite the outlets of pipes 60 and 62, and includes a chamber 101 connected to pipe 62 and two chambers 102 and 103 connected to pipe 60. The communication between chambers 101 and 102 is controlled by a valve 104 in one piece with a magnetic core whose movement is controlled by an electric coil 105 energized when effecting a brake release, and the communication between chamber 103 and chamber 107 connected to the atmosphere is controlled by a valve in one piece with a magnetic core controlled by an electric coil 106 energized when effecting a brake application.

Figure 11:
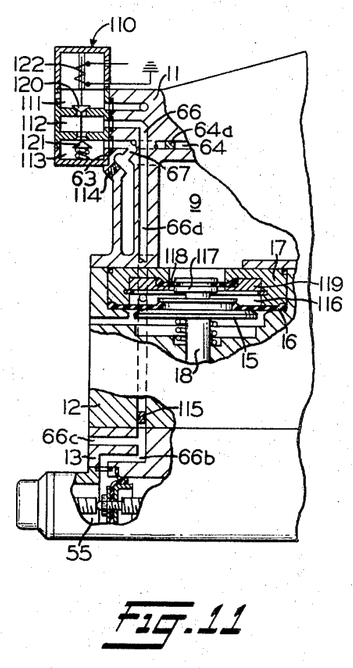

The electrovalve 110 in FIG. 11 is attached in an airtight fashion to the lateral face 63 of casing section 11. It includes a chamber 111 open to the atmosphere, a chamber 112 connected to pipe 66, and a chamber 113 connected to pipe 67 and separated from pipe 64 by a plug 64a Plug 68 (FIGS. 5 and 6) is replaced here by a screw-threaded plug 114, which provides for a communication between pipe 67 and service tank 9. Pipe 66 consists of two parts 66a and 66b, separated by an airtight plug 115. Pipe 66a connects chamber 112 to an intermediate chamber 116 positioned between diaphragm follower 15 and an additional diaphragm follower 117 connected to it so as to move therewith. A diaphragm 118 is connected to diaphragm follower 117 of the relay valve device in an airtight fashion and may be moved axially since this flexible diaphragm 118 has its external periphery clamped between a plate 119 and the plate 17. Pipe 66b is connected, should the occasion arise, with a pressure source depending on the load - for example a manual or automatic cock or a load-weighing mechanism that provides a pressure proportional to load - via a pipe 66c emerging outside casing section 13 (or 12).

Electrovalve 110 contains two valves 120 and 121 which control the communication between chambers 111 and 112 and chambers 112 and 113, respectively. The two valves are secured together and to a core activated by an electric coil 122.

Operation

The load-compensating relay valve device represented on the figures functions in the manner that is described below. Service tank 9 is at atmospheric pressure during those periods when the brakes are not activated. When the train engineer causes the pressure to drop in the train pipe CG (FIG. 1) by activating the engineer's brake valve in the locomotive, the brake control valve DI mounted on each car supplies fluid under pressure to pipe 8 (FIGS. 2 and 5) connected to service tank 9 of the relay valve device RE until the air pressure therein is essentially proportional to the value of this pressure drop compared to the control pressure in control reservoir RC.

The above pressure acts on piston 15 and its diaphragm 16 to produce a force directed downwards and transmitted to finger 19 (FIG. 5). A force proportional according to the ratio of the length of arms 51a and 51b of lever 51 attached to carriage 50, is transmitted to finger 38 which force acts in an upward direction on hollow rod 27.

The transmittal of the force mentioned above takes place according to a fixed ratio (FIG. 6) or according to at least two fixed ratios (FIGS. 7 and 8), going from one to the other when the load exceeds a certain threshold. It may also take place according to a ratio varying in a continuous manner as a function of the load (FIGS. 5, 9, and 11).

The hollow rod 27 is subject to a second fluid pressure force which also acts in an upward direction. This force results from the fluid under pressure supplied from the service tank 9 to the chamber 30 via the choke 37 and acting in an upward direction on the effective area of the lower side of the diaphragm 39.

It should be noted that the fluid under pressure supplied to the chamber 30 is ineffective to deflect the diaphragm 40 downward until the pressure in this chamber 30 and acting on the effective area of the upper side of diaphragm 40 builds up to a value to establish a fluid pressure force acting in a downward direction that exceeds the force of the spring 43 which force acts in an upward direction.

Accordingly, prior to the pressure in the chamber 30 increasing to the value necessary to provide a fluid pressure force in excess of the force of the spring 43, the hollow rod 27 is moved upward by the force transmitted thereto from the lever 51 and by the fluid pressure force resulting from the fluid under pressure present in the chamber 30 and acting on the effective area of the lower side of the diaphragm 39. Therefore, the hollow rod 27 moves upward until the exhaust valve seat at the upper end of this rod 27 is moved into abutting relationship with the lower side of disc valve 28 thereby closing communication between chamber 32 to which the brake cylinder CF is connected by the pipe 3 and atmosphere.

Further upward movement of the hollow rod 27 lifts disc valve 28 from the supply valve seat. Upon unseating of disc valve 28 from the supply valve seat, a communication is established between chambers 33 and 32. Since chamber 33 is connected to the auxiliary reservoir RA via passageway 34, chamber 35 and pipe 2a, fluid under pressure will now flow from the auxiliary reservoir RA to the chamber 33 and the brake cylinder CF to cause a force to be transmitted through the piston rod of this brake cylinder and brake rigging (not shown) to the brake shoes (not shown) to move these brake shoes into braking contact with the tread surface of the wheels (not shown) of the railway vehicle.

It can be seen from FIG. 5 that some of the fluid under pressure supplied to the chamber 32 flows through the choke 36 to the chamber 29 at a rate determined by the size of this choke 36. The fluid under pressure thus supplied to the chamber 29 acts on the effective area of the upper side of the diaphragm 39 to establish a fluid pressure force which acts in a downward direction on the hollow rod 27 in opposition to the two abovedescribed forces which are acting in an upward direction on this rod 27.

Subsequent to the pressure in the chamber 30 increasing sufficiently to provide a fluid pressure force that exceeds the force of the spring 43, the diaphragm 40 and diaphragm follower 26 will be deflected downward against the yielding resistance of this spring 43 until this follower 26 is moved into abutting relationship with the snap ring 44.

Subsequent to movement of the diaphragm follower 26 into abutting relationship with the snap ring 41, the fluid under pressure present in the chamber 30 acts in an upward direction on the effective area of the lower side of the diaphragm 39 and in a downward direction on the effective area of the upper side of the diaphragm 40.

It is apparent from FIG. 5 that the effective area of the upper side of the diaphragm 40 is greater than the effective area of the lower side of the diaphragm 39. Accordingly, it is obvious that the fluid under pressure in the chamber 30, subsequent to movement of the diaphragm follower 26 into abutting relationship with the snap ring 44 provides a fluid pressure force that acts on the hollow rod 27 in a downward direction and in opposition to the force transmitted to this rod via the lever 51. Consequently, the force acting in an upward direction on the hollow rod 27 is equal to the difference in these two fluid pressure forces. Therefore, in order to effect reseating of the disc valve 28 on its supply valve seat, fluid under pressure must be supplied from the chamber 32 to the chamber 29 via the choke 36 until the pressure in this chamber 29 establishes a fluid pressure force that acts in a downward direction on the rod 27 and is in excess of the differential force acting in an upward direction on this rod.

From the foregoing, it is apparent that fluid under pressure is initially supplied to the brake cylinder CF at a fast rate until the pressure in the chamber 30 reaches a value sufficient to establish a fluid pressure force that is in excess of the force of the spring 43, and that thereafter fluid under pressure is supplied to the brake cylinder CF at a slower rate until the disc valve 28 is reseated on its supply valve seat to terminate further supply of fluid under pressure to the brake cylinder CF and chambers 32 and 29.

Accordingly, the brake shoes are quickly brought into braking contact with the tread surface of the corresponding wheels, after which these shoes are pressed against these wheels with an increasing braking force until the valve 28 is reseated on the supply valve seat to cut off further supply of fluid under pressure to the brake cylinder CF.

To effect a release of the brake application, fluid under pressure is supplied to the train brake pipe CG upon the engineer moving the engineer's brake valve to its release position. The control valve DI operates in response to this increase in train brake pipe pressure to release fluid under pressure from the service tank 9 of the load compensating relay valve device DI to atmosphere.

Upon the release of fluid under pressure from the service tank 9, fluid under pressure will likewise be released from the chamber 30 via the choke 37. Consequently, fluid under pressure in the chamber 29 will move the hollow rod 27 downward to the position shown in FIG. 5 so that the valve 28 is seated on its supply valve seat and the exhaust valve seat on the upper end of hollow rod 27 is moved out of contact with the lower side of valve 28. Consequently, the brake cylinder CF, and chambers 29 and 32 are open to the atmosphere via the hollow rod 27, the holes in the spring seat 42, chamber 31 and the exhaust passageway extending through annular member 23 and casing section 12.

With the cut-off device or blanking pad 69 shown in FIG. 6, chamber 55 (FIG. 5) is separated from pipe 64 which is connected to the auxiliary reservoir and this chamber 55 is maintained at atmospheric pressure. Furthermore, spring 56 pushes carriage 50 towards the left up to a stop position determined by adjustable stop screw 59. It is observed that the transmission of force from rod 18 to hollow rod 27 takes place in a fixed ratio, determined by the ratio of the lengths of arms 51a and 51b, depending on the position of the carriage 50 which is determined by stop 59.

On the other hand, with the manual cock shown in FIG. 7, pipe 66 opening into chamber 55 is either connected by a rotary valve (not shown) to the atmosphere for one position of a handle 71, and controlled via cam 72, or it is connected in a second position of handle 71 to pipe 64 that is connected to pipe 2a which in turn is connected to the auxiliary reservoir RA. In the first handle position, carriage 50 is biased by spring 56 towards the left until the end of rod 53 reaches a stop position against adjustable stop 59. In the second handle position, the pressure of the auxiliary reservoir is supplied to chamber 55 and carriage 50 is impelled towards the right, in opposition to spring 56, until a stop position is reached against adjustable stop rod 58. The stop devices 58 and 59 are adjustable and it is understood that the two force transformation ratios supplied by the load-compensating relay valve device RE may be brought to values that furnish the exact braking performances desired for each type of vehicle and each position of lever 71.

Valve device 80 (FIG. 8) makes it possible to bring carriage 50 into one of the two positions that were just defined but, unlike cock 70, it functions as an automatic switch valve when the air pressure, proportional to the load, transmitted from a load weighing mechanism to chamber 83 via pipes 65 and 84, produces a force on piston 81 that exceeds the prestress of its return spring. Piston 81 then activates slide valve 82, which moves into the position connecting pipe 66 to the atmosphere.

Carriage 50 (FIG. 5) is obviously designed so that it will move in a continuous manner in a course proportional to the weighing pressure found in chamber 55. This case is represented on FIG. 9, where pipe 66 is separated from pipe 64 and connected directly to pipe 65 supplied with fluid under pressure by a load weighing mechanism, such as DP shown in FIG. 1, furnishing a pressure proportional to the load.

In the type of embodiment shown in FIG. 10, in addition to the possibilities mentioned above for continuous or discontinuous modulation as a function of the load, the load compensating relay valve device in question makes possible an electric remote control of the discharge and filling-up of the train pipe. If release coil 105 is excited, pipe 60 connected to the train pipe is put in communication with chamber 35 which is connected to the auxiliary reservoir by pipe 2a (FIG. 5) and, if application coil 106 is excited, pipe 60 is connected directly to chamber 107 which is open to atmosphere. We thus profit at once from the intercalary position of the load compensating relay valve device RE between the brake control valve DI and the control reservoir RC, as well as from supplying fluid under pressure from the train pipe CG to the auxiliary reservoir RA and releasing fluid under pressure from the brake pipe to atmosphere in order to permit electric remote control of the braking.

In the type of embodiment in FIG. 11, chamber 55 is connected by pipes 66b and 66c either to the atmosphere or to one of the components shown in FIGS. 6 to 9, subsequently mounted to the left of the outlet of pipe 66c after the placing of plug 115 in the position shown. The peculiarity of this type of construction lies in the fact that electrovalve 110, according to whether its coil 122 is energized or not, connects chamber 116 either to the atmosphere or to pipe 67, and thus to service tank 9. In the first case, a force is obtained on rod 18 which is proportional to the effective area of the upper side of diaphragm 118 and, in the second case, to the effective area of the upper side of diaphragm 16 of piston 15. Thus, when the energization of coil 122 depends on the velocity indications of a tachometric sensor, in the first case it is possible to obtain braking at a small pressure, generally corresponding to the slowest speeds of the railroad vehicle when the coefficient of friction between the brake shoes and the wheels is high. In the second case (effect of the pressure from tank 9 on the surface of the upper side of diaphragm 16), it is possible to obtain braking at a higher pressure, corresponding to higher speeds of the vehicle when the coefficient of friction between the brake shoes and the wheels is small. A return to the low braking pressures may be provided for very high speeds, where the heating up of the wheels might become too great and where the friction of the brake shoes on the wheels is nevertheless required in order to assure cleaning of the rolling surface of these wheels during braking.

Numerous other combinations accessible to the specialist in the area may be considered with the aid of the arrangements described in FIGS. 5 to 11, without deviating from the spirit of the invention and, of course, the load compensating air operated relay valve device according to the invention may be applied to pressurized fluids other than compressed air, in particular to hydraulic fluids.

Having now described the invention, what we claim as new and desire to secure by Letters Patent, is:

1. In a vehicle fluid pressure brake apparatus, the combination of a fluid-pressure-operated load compensating relay valve device operable to effect the supply of fluid under pressure from a charged auxiliary reservoir to a brake cylinder and being disposed between and secured to a graduated release type brake control valve and a control reservoir therefor, wherein the improvement comprises providing said load compensating relay valve device with a sectionalized casing having a plurality of casing sections, one of said casing sections having extending therethrough a plurality of passageways, one of which passageways provides a communication between said control reservoir and said brake control valve, and another of which passageways provides a communication between said auxiliary reservoir and said brake control valve, said another passageway having a branch passageway from which fluid under pressure may be supplied to said brake cylinder upon operation of said load compensating relay valve device to establish a communication between said branch passageway and said brake cylinder whereupon fluid under pressure flows from said auxiliary reservoir to said brake cylinder to cause a brake application.

2. A fluid-pressure-operated load compensating relay valve device comprises:
   a. a rockable lever,
   b. an adjustable fulcrum therefor,
   c. fluid pressure control valve means controlled by said lever for controlling the pressure of fluid in said brake cylinder,
   d. a first movable abutment connected to said lever and subject to and operable by fluid under pressure supplied to one side thereof by operation of said brake control valve to actuate said lever and valve means to supply fluid under pressure to said brake cylinder,
   e. a second movable abutment connected to said lever and subject on one side to pressure of fluid in said brake cylinder acting in opposition to pressure of fluid on said first movable abutment for actuating said lever and control valve means to limit the pressure of fluid in said brake cylinder to a chosen degree,
   f. a third movable abutment having a limited lost-motion connection in one direction with said lever and a greater effective area than said second abutment, one side of said third abutment and the other side of said second abutment cooperating to form a chamber supplied with fluid under pressure from said one side of said first abutment,
   g. biasing means providing a force effective on the other side of said third abutment whereby said control valve means is operable cojointly by the combined fluid pressure forces provided by the fluid under pressure effective on said one side of said first abutment and on said one side of said third abutment to supply fluid under pressure to said brake cylinder at a first rate until the pressure in said chamber establishes a fluid pressure force acting on said one side of said third abutment that exceeds the force of said biasing means effective on said other side of said third abutment, said control valve means being thereafter operable cojointly by the difference in the pressure force provided by the fluid under pressure effective on said one side of said first abutment and the differential fluid pressure force resulting from the fluid under pressure present in said chamber and simultaneously effective on said one side of said third abutment and said other side of said second abutment, to supply fluid under pressure to said brake cylinder at a second rate that is less than said first rate.

3. A load compensating relay valve device, as recited in claim 2, further characterized in that said relay valve device further comprises a bias piston operable upon the supply of fluid under pressure to a bias piston chamber to move said adjustable fulcrum to a plurality of different positions, and said another passageway having a second branch passageway selectively connectable to said bias piston chamber.

4. A load compensating relay valve device, as recited in claim 3, further characterized by yieldable means resisting movement of said bias piston upon the supply of fluid under pressure to said bias piston chamber, said yieldable means being effective to move said bias piston and said adjustable fulcrum to a chosen position in the absence of fluid under pressure in said chamber.

5. A load compensating relay valve device, as recited in claim 3, further characterized by manually operable means for selectively opening and closing a communication between said second branch passageway and said bias piston chamber.

6. A load compensating relay valve device, as recited in claim 3, further characterized by fluid pressure operable means for selectively opening and closing a communication between said second branch passageway and said bias piston chambers.

7. A load compensating relay valve device, as recited in claim 3, further characterized in that said one casing section has formed on the exterior thereof a flat face at the surface of which opens one end of said second branch passageway and one end of a third passageway that extends through said plurality of casing sections and opens at its opposite end into said bias piston chamber, and by means removably secured to said flat face for closing communication between said second branch passageway and said third passageway.

8. A load compensating relay valve device, as recited in claim 7, further characterized in that said one casing section has formed therein a fourth passageway through which fluid under pressure may be received from a loadweighing mechanism at a pressure proportional to the load carried on the vehicle, one end of said fourth passageway opening at the surface of said flat face, and said means removably secured to said flat face comprises a valve controlling flow of fluid under pressure between said second branch passageway and said third passageway and a movable abutment for operating said valve, said abutment being subject on one side to fluid under pressure supplied through said fourth passageway and on the other side to a fixed bias.

9. A load compensating relay valve device, as recited in claim 7, further characterized in that said one casing section has formed therein a fourth passageway through which fluid under pressure may be received from a load-weighing mechanism at a pressure proportional to the load carried on the vehicle, one end of said fourth passageway opening at the surface of said flat face, and said means removably secured to said flat face comprises a member having a flat face for abutting relationship with said flat face on said one casing section to close communication between said second branch of said another passageway and said third passageway, said member being provided with a passageway extending therethrough and having its respective opposite ends opening at said flat face thereon, said opposite ends being so located that said passageway provides a permanent communication between said third passageway and said fourth passageway.

10. A load compensating relay valve device, as recited in claim 9, further characterized in that a fourth movable abutment is so disposed that one side thereof cooperates with the other side of said first movable abutment to form a chamber therebetween, and said one casing section and a second casing section of said plurality of casing sections cooperating to form a chamber at the other side of said fourth abutment for receiving fluid under pressure supplied thereto upon operation of said control valve, said one and said second casing sections having a fifth passageway extending therethrough from said first mentioned chamber and opening at said flat surface on said one casing section and a sixth passageway extending therethrough from said second mentioned chamber and opening at said flat surface whereby an electromagnetic valve device secured to said flat face is operable to either establish a communication between said fifth passageway and atmosphere or establish a communication between said fifth and sixth passageways.

11. A load compensating relay valve device, as recited in claim 10, further characterized by means closing communication between one end and the other end of said third passageway thereby so dividing said third passageway that one portion thereof opens at said surface of said flat face on the exterior of said one casing section and the other portion opens into said bias piston chamber, and said fifth passageway opening into said one portion intermediate the ends thereof.

12. A load compensating relay valve device, as recited in claim 10, further characterized by means closing communication between one end and the other end of said second branch passageway thereby dividing said second branch passageway into two portions, one of which portions opens into said another passageway, and means provided in said one casing section for connecting the other of said portions of said second branch passageway to said sixth passageway.

13. A load compensating relay valve device, as recited in claim 10, further characterized in that said one casing section has formed on the exterior thereof a second flat face and is provided with a seventh passageway extending therethrough via which fluid under pressure is supplied to said brake control valve to control operation thereof, said seventh passageway having a first branch passageway and said another passageway having a third branch passageway, said branch passageways each opening at one end at the surface of said second flat face whereby one of a pair of electromagnetic valve devices secured to said second flat face is operable to establish a communication between said first branch of said seventh passageway and said third branch of said another passageway while the other of said electromagnetic valve devices closes communication between said first branch of said seventh passageway and atmosphere, or said one electromagnetic valve device is operable to close communication between said first branch of said seventh passageway and said third branch of said another passageway while said other electromagnetic valve device opens communication between said first branch of said seventh passageway and atmosphere.

* * * * *